United States Patent
Kodera

(10) Patent No.: US 12,497,101 B2
(45) Date of Patent: Dec. 16, 2025

(54) STEERING CONTROL DEVICE AND STEERING CONTROL METHOD

(71) Applicant: JTEKT CORPORATION, Kariya (JP)

(72) Inventor: Takashi Kodera, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 15 days.

(21) Appl. No.: 18/833,011

(22) PCT Filed: Feb. 3, 2022

(86) PCT No.: PCT/JP2022/004260
§ 371 (c)(1),
(2) Date: Jul. 25, 2024

(87) PCT Pub. No.: WO2023/148884
PCT Pub. Date: Aug. 10, 2023

(65) Prior Publication Data
US 2025/0115294 A1    Apr. 10, 2025

(51) Int. Cl.
*B62D 6/00*    (2006.01)
*B62D 6/10*    (2006.01)

(52) U.S. Cl.
CPC .............. *B62D 6/008* (2013.01); *B62D 6/10* (2013.01)

(58) Field of Classification Search
CPC .................. B62D 6/008; B62D 6/10
See application file for complete search history.

(56) References Cited

U.S. PATENT DOCUMENTS

| 6,983,818 B2 | 1/2006 | Fujioka et al. |
| 10,889,319 B2 | 1/2021 | Moulaire et al. |
| 2007/0114094 A1 | 5/2007 | Tamaizumi |
| 2013/0311044 A1 | 11/2013 | Tamaizumi et al. |
| 2014/0343794 A1 | 11/2014 | Tamaizumi et al. |
| 2014/0365077 A1 | 12/2014 | Kariatsumari et al. |
| 2016/0167707 A1* | 6/2016 | Lee ............. B62D 15/029 701/41 |
| 2016/0368533 A1 | 12/2016 | Kariatsumari et al. |

(Continued)

FOREIGN PATENT DOCUMENTS

| EP | 2 813 413 B1 | 11/2016 |
| JP | 2006-298223 A | 11/2006 |

(Continued)

OTHER PUBLICATIONS

Mar. 11, 2025 extended Search Report issued in European Patent Application No. 22924795.2.

(Continued)

*Primary Examiner* — Phutthiwat Wongwian
*Assistant Examiner* — Sherman D Manley
(74) *Attorney, Agent, or Firm* — Oliff PLC

(57) ABSTRACT

A steering torque control process includes a process of calculating a manipulated variable for controlling steering torque to target steering torque by using a proportional element and a derivative element according to a difference between the steering torque and the target steering torque. At least one of the two elements, namely the proportional element and the derivative element, includes an enlarging phase controller. The enlarging phase controller is a controller that enlarges a degree to which a phase of the derivative element is advanced with respect to a phase of the proportional element.

18 Claims, 13 Drawing Sheets

(56) References Cited

U.S. PATENT DOCUMENTS

| | | | |
|---|---|---|---|
| 2017/0137055 A1* | 5/2017 | Hirate | B62D 6/008 |
| 2018/0134309 A1* | 5/2018 | Moulaire | B62D 5/0463 |
| 2019/0367083 A1* | 12/2019 | Kodera | B62D 6/04 |

FOREIGN PATENT DOCUMENTS

| | | | |
|---|---|---|---|
| JP | 2007-083827 A | 4/2007 | |
| JP | 2014-223832 A | 12/2014 | |
| JP | 2019-064482 A | 4/2019 | |
| WO | 2012/133590 A1 | 10/2012 | |

OTHER PUBLICATIONS

Apr. 19, 2022 International Search Report issued in International Patent Application No. PCT/JP2022/004260.

* cited by examiner

STEERING CONTROL DEVICE AND STEERING CONTROL METHOD

CROSS-REFERENCE TO RELATED APPLICATIONS

This application is national stage application of International Application No. PCT/JP2022/004260, filed on Feb. 3, 2022, which designates the United States, the entire contents of which are incorporated herein by reference.

TECHNICAL FIELD

The present disclosure relates to steering control devices and steering control methods.

BACKGROUND ART

For example, Patent Document 1 below describes a control device that controls steering torque, namely torque that is applied to a steering wheel, to a target value by feedback control.

RELATED ART DOCUMENTS

Patent Documents

Patent Document 1: Japanese Unexamined Patent Application Publication No. 2014-223832 (JP 2014-223832 A)

SUMMARY OF THE INVENTION

Problem to be Solved by the Invention

The issue with performing such feedback control on torque is to balance stability and responsiveness.

Means for Solving the Problem

An aspect of the present disclosure provides a steering control device that operates a motor mechanically connected to an operating member to be operated by a driver to steer a vehicle. The steering control device is configured to perform a steering torque control process and an operation process. The steering torque control process includes a process of calculating a manipulated variable for controlling steering torque to target steering torque by using a proportional element and a derivative element according to a difference between the steering torque and the target steering torque. The operation process is a process of operating a drive circuit for the motor in order to control torque of the motor according to the manipulated variable. The steering torque is torque input to the operating member. At least one of the two elements, namely the proportional element and the derivative element, includes an enlarging phase controller. The enlarging phase controller is configured to enlarge a degree to which a phase of the derivative element is advanced with respect to a phase of the proportional element.

Another aspect of the present disclosure provides a steering control method for operating a motor mechanically connected to an operating member to be operated by a driver to steer a vehicle. The steering control method includes: performing a steering torque control process; and performing an operation process. The steering torque control process includes a process of calculating a manipulated variable for controlling steering torque to target steering torque by using a proportional element and a derivative element according to a difference between the steering torque and the target steering torque. The operation process is a process of operating a drive circuit for the motor in order to control torque of the motor according to the manipulated variable. The steering torque is torque input to the operating member. The steering torque control process includes a process of enlarging a degree to which a phase of the derivative element is advanced with respect to a phase of the proportional element, by providing an enlarging phase controller in at least one of the two elements, namely the proportional element and the derivative element.

MODES FOR CARRYING OUT THE INVENTION

First Embodiment

A first embodiment of a steering control device will be described below with reference to the drawings.

"Prerequisite Configuration"

Figure 1:
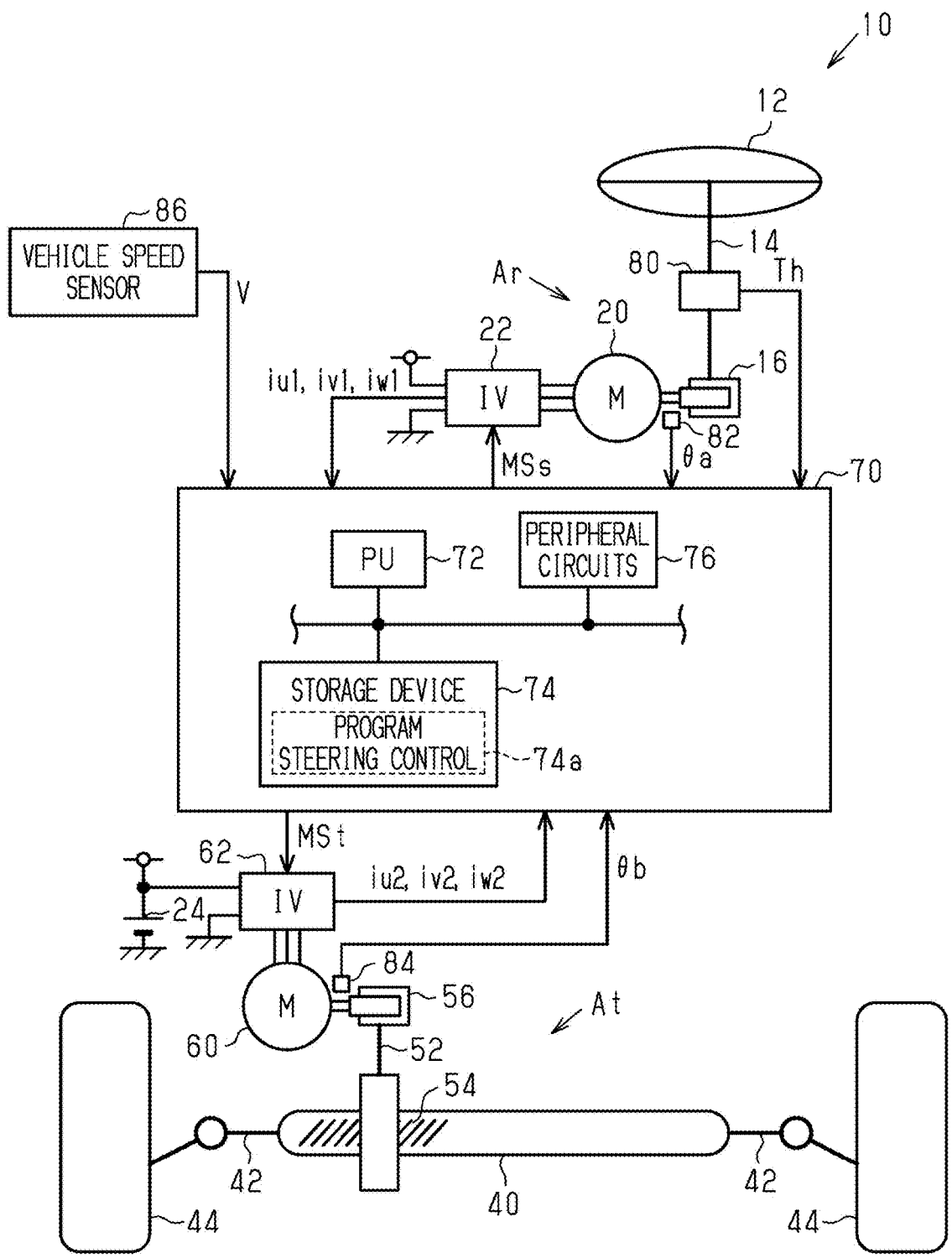
FIG. 1 is a diagram showing the configuration of a steering system according to a first embodiment.

As shown in FIG. 1, a steering system 10 of a vehicle includes a reaction force actuator Ar and a steering actuator At. The steering system 10 of the present embodiment has a structure in which a power transmission path between a steering wheel 12 and steered wheels 44 is mechanically disconnected. That is, the steering system 10 includes a steer-by-wire steering device.

A steering shaft 14 is connected to the steering wheel 12. The reaction force actuator Ar is an actuator that applies a steering reaction force to the steering wheel 12. The steering reaction force refers to a force that acts in an opposite direction to a direction in which the steering wheel 12 is operated by a driver. Applying the steering reaction force to the steering wheel 12 can provide a suitable tactile feedback to the driver. The reaction force actuator Ar includes a speed reduction mechanism 16, a reaction force motor 20, and a reaction force inverter 22.

The reaction force motor 20 is a three-phase brushless motor. A rotating shaft of the reaction force motor 20 is connected to the steering shaft 14 via the speed reduction mechanism 16. The reaction force inverter 22 is a power conversion circuit that converts the voltage of a battery 24 that is a direct current voltage source to an alternating current voltage and applies the alternating current voltage to the reaction force motor 20.

A steered shaft 40 extends in a vehicle width direction that is a left-right direction in FIG. 1. The right and left steered wheels 44 are connected to both ends of the steered shaft 40 via tie rods 42. The steered angle of the steered wheels 44 is changed as the steered shaft 40 makes a linear motion.

The steering actuator At includes a speed reduction mechanism 56, a steering motor 60, and a steering inverter 62. The steering motor 60 is a three-phase brushless motor. A rotating shaft of the steering motor 60 is connected to a pinion shaft 52 via the speed reduction mechanism 56. Pinion teeth of the pinion shaft 52 mesh with rack teeth 54 of the steered shaft 40. The pinion shaft 52 and the steered shaft 40 with the rack teeth 54 form a rack and pinion mechanism. Torque of the steering motor 60 is applied as a steering force to the steered shaft 40 via the pinion shaft 52. The steered shaft 40 moves in the vehicle width direction that is the left-right direction in FIG. 1 with rotation of the steering motor 60.

The steering system 10 includes a control device 70. The steering device is a controlled object of the control device 70. More specifically, the steering wheel 12 of the steering device is a controlled object of the control device 70. The control device 70 operates the reaction force actuator Ar in order to control the steering reaction force that is a controlled variable for the controlled object. An operation signal MSs for the reaction force inverter 22 is shown in FIG. 1. The steered wheels 44 of the steering device are also controlled objects of the control device 70. The control device 70 operates the steering actuator At in order to control the steered angle of the steered wheels 44 that is a controlled variable for the controlled objects. The steered angle is a turning angle of tires. An operation signal MSt for the steering inverter 62 is shown in FIG. 1.

The control device 70 refers to steering torque Th detected by a torque sensor 80, namely input torque to the steering shaft 14, in order to control the controlled variable. The torque sensor 80 includes a torsion bar connected to the steering shaft 14, and a sensing element that detects a torsion angle of the torsion bar. The control device 70 also refers to a rotation angle θa of the rotating shaft of the reaction force motor 20 detected by a rotation angle sensor 82. The control device 70 also refers to currents iu1, iv1, and iw1 flowing through the reaction force motor 20. The currents iu1, iv1, and iw1 are quantified as voltage drops across shunt resistors provided in legs of the reaction force inverter 22. The control device 70 refers to a rotation angle θb of the rotating shaft of the steering motor 60 detected by a rotation angle sensor 84, in order to control the controlled variable. The control device 70 also refers to currents iu2, iv2, and iw2 flowing through the steering motor 60. The currents iu2, iv2, and iw2 are quantified as voltage drops across shunt resistors provided in legs of the steering inverter 62. The control device 70 also refers to a vehicle speed V detected by a vehicle speed sensor 86.

The control device 70 includes a PU 72, a storage device 74, and peripheral circuits 76. The PU 72 is a software processing device such as a CPU, a GPU, and a TPU. The storage device 74 includes a storage medium such an electrically rewritable nonvolatile memory and a disk medium. The storage device 74 stores a steering control program 74a. The peripheral circuits 76 include a circuit for generating a clock signal that regulates internal operations, a power supply circuit, and a reset circuit. The control device 70 controls the controlled variables by the PU 72 executing the steering control program 74a stored in the storage device 74.

"Control"

Figure 2:
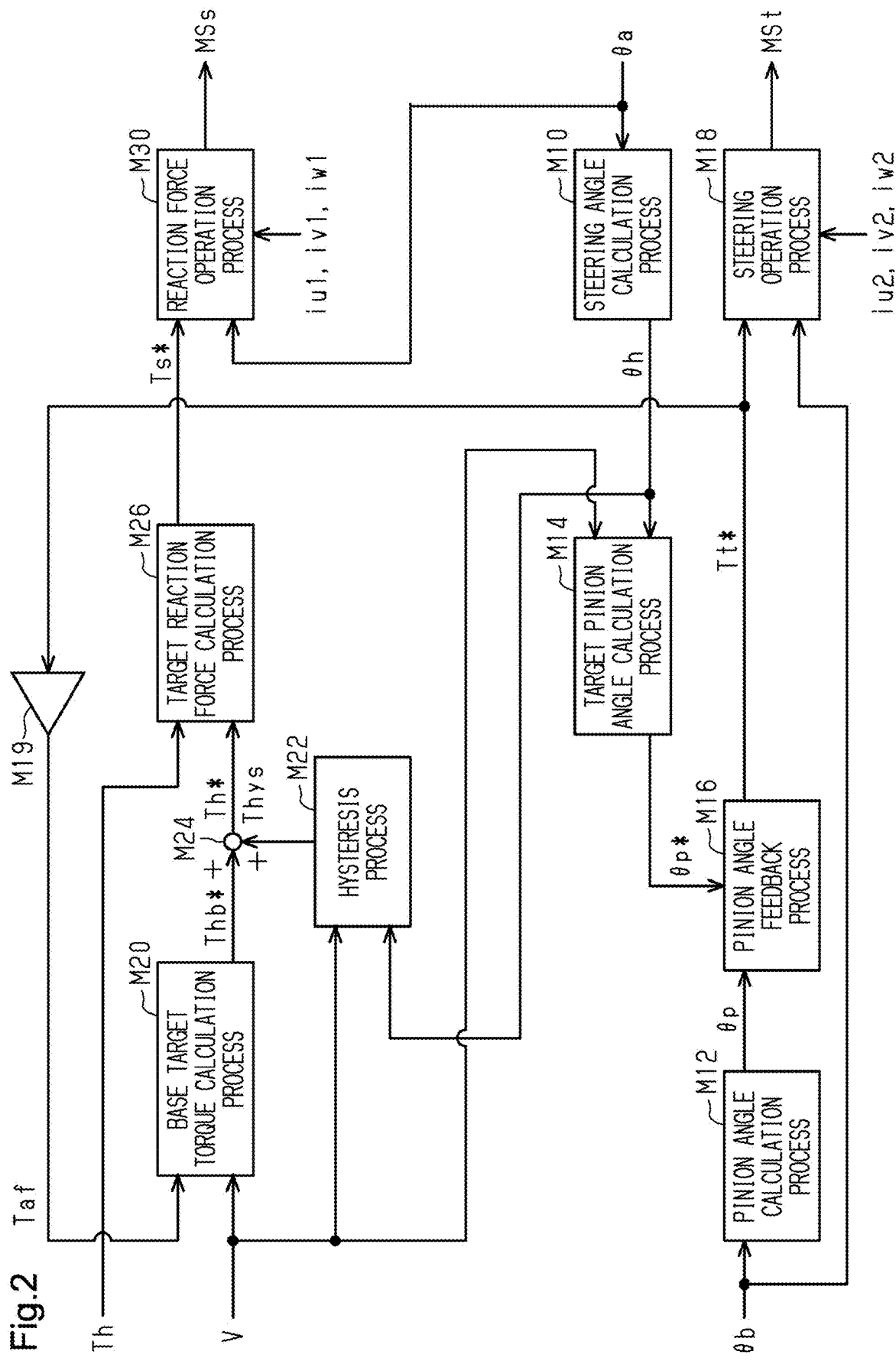
FIG. 2 is a block diagram showing processes that are performed by a control device according to the first embodiment.

FIG. 2 shows part of processes that are performed by the control device 70.

A steering angle calculation process M10 is a process of calculating a steering angle θh that is a rotation angle of the steering wheel 12 by using the rotation angle θa as an input. The steering angle calculation process M10 includes a process of converting the rotation angle θa to, for example, a cumulative angle including a range exceeding 360° by counting the number of revolutions of the reaction force motor 20 from a neutral steering position that is the position of the steering wheel 12 when the vehicle is traveling straight. The steering angle calculation process M10 includes a process of calculating the steering angle θh by multiplying the cumulative angle obtained by the conversion by a conversion factor that is based on a rotational speed ratio of the speed reduction mechanism 16. For example, the steering angle θh is positive when it is an angle to the right of the neutral steering position, and is negative when it is an angle to the left of the neutral steering position.

A pinion angle calculation process M12 is a process of calculating a pinion angle θp that is a rotation angle of the pinion shaft 52 by using the rotation angle θb as an input. The pinion angle calculation process M12 includes a process of converting the rotation angle θb, for example, a cumulative angle including a range exceeding 360° by counting the number of revolutions of the steering motor 60 from a neutral rack position that is the position of the steered shaft 40 when the vehicle is traveling straight. The pinion angle calculation process M12 includes a process of calculating the pinion angle θp that is an actual rotation angle of the pinion shaft 52 by multiplying the cumulative angle obtained by the conversion by a conversion factor that is based on a rotational speed ratio of the speed reduction mechanism 56. For example, the pinion angle θp is positive when it is an angle to the right of the neutral rack position, and is negative when it is an angle to the left of the neutral rack position. The steering motor 60 and the pinion shaft 52 operate in conjunction with each other via the speed reduction mechanism 56. Therefore, there is a one-to-one correspondence between a cumulative value of the rotation angle θb of the steering motor 60, and the pinion angle θp. The pinion angle θp can be obtained from the rotation angle θb of the steering motor 60 using this correspondence. The pinion shaft 52 meshes with the steered shaft 40. Therefore, there is also a one-to-one correspondence between the pinion angle θp and the amount of movement of the steered shaft 40. That is, the pinion angle θp is a value that reflects the steered angle of the steered wheels 44.

A target pinion angle calculation process M14 is a process of calculating a target pinion angle θp* by using the steering angle θh and the vehicle speed V as inputs. The target pinion angle θp* is a target value of the pinion angle θp according to the operation of the steering wheel 12 by the driver. The target pinion angle calculation process M14 includes a process of variably setting a steering angle ratio according to the vehicle speed V. Accordingly, the value of the target pinion angle θp* output from the target pinion angle calculation process M14 varies according to the vehicle speed V even when the input steering angle θh is the same.

A pinion angle feedback process M16 is a process of calculating a steering torque command value Tt* that is a command value for the torque of the steering motor 60 in order to control the pinion angle θp to the target pinion angle θp* by feedback control.

A steering operation process M18 is a process of outputting the operation signal MSt for the steering inverter 62 by using the steering torque command value Tt*, the currents iu2, iv2, and iw2, and the rotation angle θb as inputs. The steering operation process M18 includes a process of calculating dq-axis current command values based on the steering torque command value Tt*. The steering operation process M18 includes a process of calculating dq-axis currents based on the currents iu2, iv2, and iw2 and the rotation angle θb. The steering operation process M18 includes a process of calculating the operation signal MSt in order to operate the steering inverter 62 so that the dq-axis currents are brought to the command values.

An axial force calculation process M19 includes a process of calculating an axial force Taf by using the steering torque command value Tt* as an input. The axial force Taf is a force in the axial direction that is applied to the steered shaft 40. A base target torque calculation process M20 is a process of calculating, based on the axial force Taf, base target torque Thb* that is a base value of target steering torque Th* to be input to the steering shaft 14 by the driver via the steering wheel 12. Since the axial force Taf is a quantity according to a lateral force acting on the steered wheels 44, the lateral force can be known from the axial force Taf. It is desirable that torque to be input to the steering shaft 14 by the driver via the steering wheel 12 be determined according to the lateral force. Therefore, the base target torque calculation process M20 is a process of calculating the base target torque Thb* according to the lateral force known from the axial force Taf.

Specifically, the base target torque calculation process M20 is a process of variably setting an absolute value of the base target torque Thb* according to the vehicle speed V even when an absolute value of the axial force Taf is the same. This process may be a process of performing a calculation so that the absolute value of the base target torque Thb* when the vehicle speed V is small is equal to or less than the absolute value of the base target torque Thb* when the vehicle speed V is large. For example, this can be implemented by the PU 72 performing a map calculation of the base target torque Thb* with map data stored in advance in the storage device 74. The map data is data whose input variables are the axial force Taf or a lateral acceleration known from the axial force Taf and the vehicle speed V and whose output variable is the base target torque Thb*.

The map data is a data set of discrete values of the input variables and values of the output variable corresponding to the values of the input variables. The map calculation may be a process in which, when the values of the input variables match any of the values of the input variables in the map data, a corresponding value of the output variable in the map data is output as a calculation result. The map calculation may be a process in which, when the values of the input variables do not match any of the values of the input variables in the map data, a value obtained by interpolating a plurality of values of the output variable included in the map data is output as a calculation result. Alternatively, the map computation may be a process in which, when the values of the input variables do not match any of the values of the input variables in the map data, the value of the output variable in the map data that corresponds to the values of the input variables in the map data closest to the values of the input variables, out of the plurality of values of the output variables included in the map data, is output as a calculation result.

A hysteresis process M22 is a process of calculating and outputting a hysteresis correction amount Thys for correcting the base target torque Thb*, based on the steering angle θh. More specifically, the hysteresis process M22 includes a process of calculating the hysteresis correction amount Thys by identifying turning and returning of the steering wheel 12 based on changes in steering angle θh, etc. More specifically, the hysteresis process M22 includes a process of calculating the hysteresis correction amount Thys so that the absolute value of the target steering torque Th* becomes greater when turning than when returning. The hysteresis process M22 includes a process of variably setting the hysteresis correction amount Thys according to the vehicle speed V.

An addition process M24 is a process of calculating the target steering torque Th* by adding the hysteresis correction amount Thys to the base target torque Thb*. A target reaction force calculation process M26 is a process of calculating a target reaction force Ts* according to the steering reaction force to be applied to the steering wheel 12, by using the steering torque Th and the target steering torque Th* as inputs. The target reaction force Ts* is actually a command value for the reaction force motor 20. The steering reaction force is a value obtained by multiplying the target reaction force Ts* by a coefficient according to the reduction ratio of the speed reduction mechanism 16.

A reaction force operation process M30 is a process of outputting the operation signal MSs for the reaction force inverter 22 by using the target reaction force Ts*, the currents iu1, iv1, and iw1, and the rotation angle θa as inputs. The reaction force operation process M30 includes a process of calculating dq-axis current command values based on the target reaction force Ts*. The reaction force operation process M30 includes a process of calculating dq-axis currents based on the currents iu1, iv1, and iw1 and the rotation angle θa. The reaction force operation process M30 includes a process of calculating the operation signal MSs in order to operate the reaction force inverter 22 so that the dq-axis currents are brought to the command values.

Figure 3:
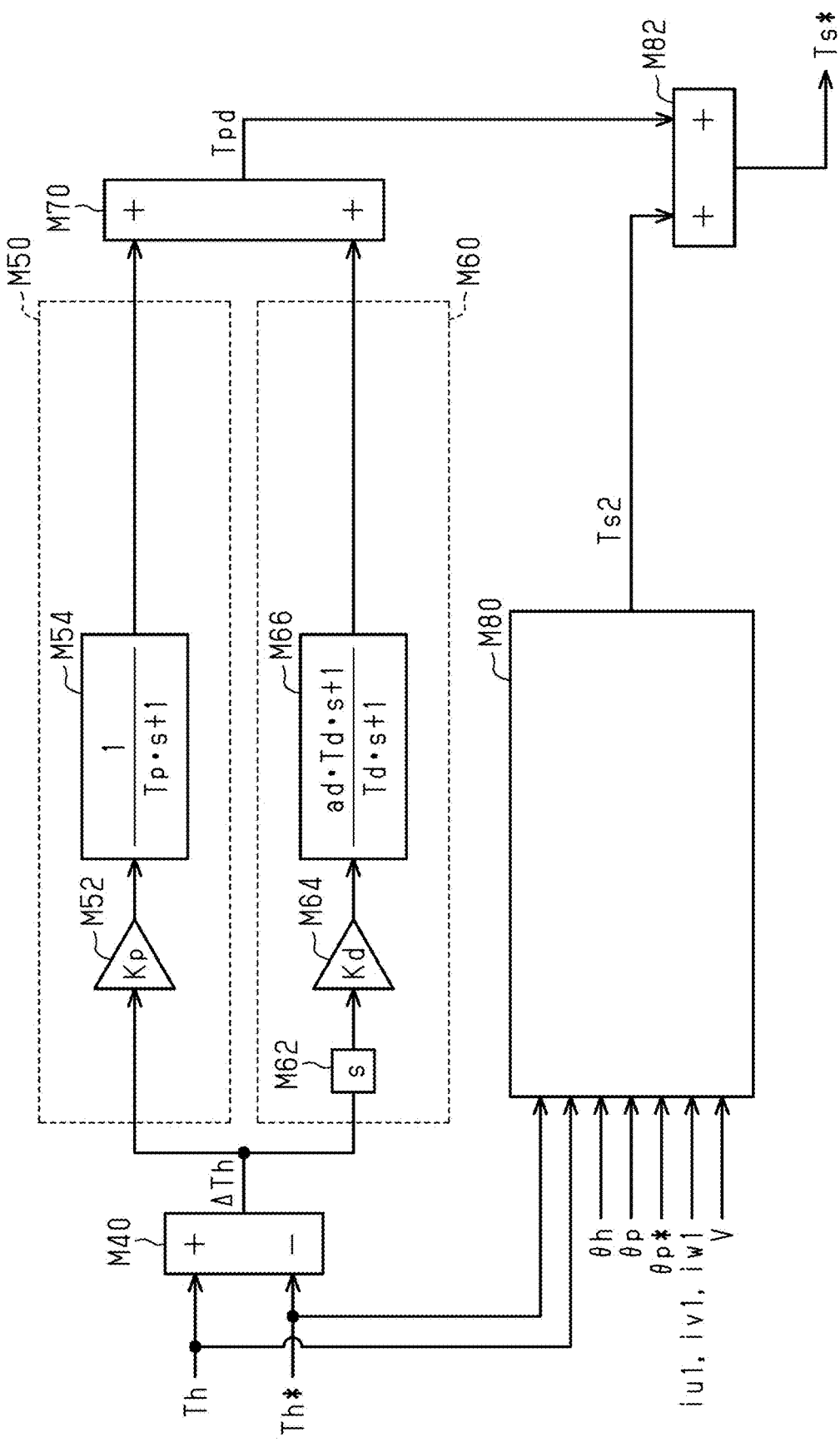
FIG. 3 is a block diagram showing details of part of the processes that are performed by the control device according to the first embodiment.

FIG. 3 shows details of the target reaction force calculation process M26. A deviation calculation process M40 is a process of calculating a torque deviation ΔTh that is a value obtained by subtracting the target steering torque Th* from the steering torque Th.

A proportional element M50 is a process that takes the torque deviation ΔTh as an input and outputs a value proportional to the torque deviation ΔTh. More specifically, a proportional gain multiplication process M52 is a process of multiplying the torque deviation ΔTh by a proportional gain Kp. A proportional phase controller M54 low-pass filters the output value of the proportional gain multiplication process M52. Specifically, the proportional phase controller M54 is a first-order lag filter shown below.

$$1/(Tp \cdot s+1)$$

where "Tp" is a time constant, and "s" is a linear operator indicating a first time derivative. The output value of the proportional phase controller M54 is the output value of the proportional element M50.

A derivative element M60 is a process that takes the torque deviation ΔTh as an input and outputs a value proportional to the time derivative of the torque deviation ΔTh. Specifically, a linear operator M62 is processing that takes the torque deviation ΔTh as an input and outputs the time derivative of the torque deviation ΔTh. A derivative gain multiplication process M64 is a process of multiplying the output value of the linear operator M62 by a derivative gain Kd. A derivative phase controller M66 is a process of advancing the phase of a predetermined frequency component of the output value of the derivative gain multiplication process M64. The derivative phase controller M66 is a phase controller with a degree difference of zero as shown below.

$$\{ad \cdot Td \cdot s+1\}/(Td \cdot s+1)$$

where "Td" is a time constant, and "ad>1."

Figure 4:
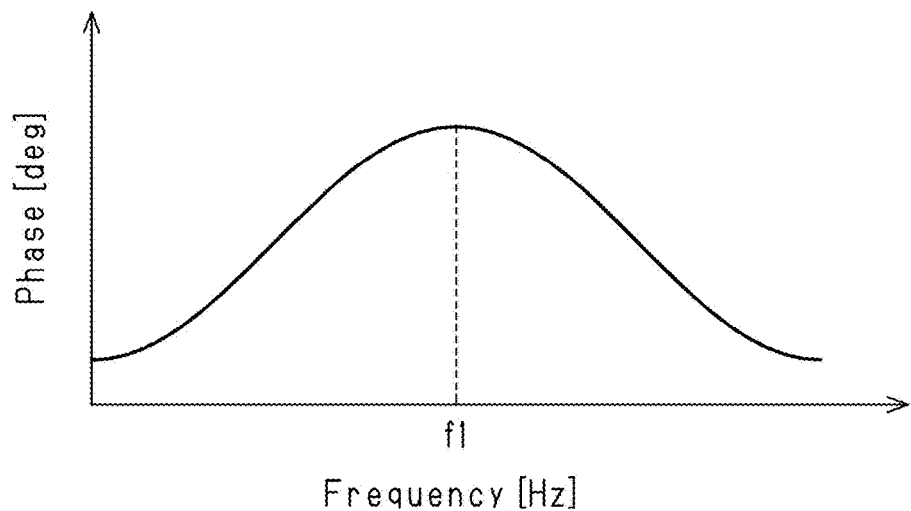
FIG. 4 is a diagram showing a characteristic of a filter according to the first embodiment.

FIG. 4 is a phase diagram of the derivative phase controller M66. As shown in FIG. 4, the derivative phase controller M66 advances the phase of frequency components near a predetermined center frequency f1. The output value of the derivative phase controller M66 is the output value of the derivative element M60.

Referring back to FIG. 3, an addition process M70 is a process of adding the output value of the proportional element M50 and the output value of the derivative element M60 and outputting the sum as a PD manipulated variable Tpd.

A second manipulated variable calculation process M80 is a process of calculating a manipulated variable other than the PD manipulated variable Tpd, for generating the target reaction force Ts*. The second manipulated variable calculation process M80 may include, for example, at least one of processes (A) to (H) described below.

The process (A) is a process of calculating a manipulated variable according to a cumulative value of a value obtained by subtracting the steering torque Th from an estimated axial force. The estimated axial force is a value equivalent to the torque of the reaction force motor 20. The estimated axial force is a value calculated by the PU 72 by inputting the currents iu1, iv1, and iw1.

The process (B) is a process of calculating, as a manipulated variable, a cumulative value of a value obtained by multiplying the difference between the steering torque Th and the target steering torque Th* by an integral gain.

The process (C) is a process of calculating a manipulated variable for controlling steering torque estimated by a disturbance observer to the target steering torque Th*. The process (C) takes, as inputs, the steering angle θh, the torque of the reaction force motor 20 calculated from the currents iu1, iv1, and iw1, etc.

The process (D) is a process of calculating an open-loop manipulated variable for which the steering torque Th is used as an input.

The process (E) is a process of calculating an open-loop manipulated variable for which the target steering torque Th* is used as an input.

The process (F) is a process of, when the magnitude of the pinion angle θp is equal to or greater than a predetermined value, calculating a manipulated variable for applying to the steering shaft 14 a force against the magnitude of the pinion angle θp becoming any greater.

The process (G) is a process of, when the magnitude of the steering angle θh is equal to or greater than a predetermined value, calculating a manipulated variable for applying to the steering shaft 14 a force against the magnitude of the steering angle θh becoming any greater.

The process (H) is a process of calculating a manipulated variable for controlling the steering angle θh to a converted steering angle obtained by converting the pinion angle θp to the steering angle θh by feedback control. The converted steering angle is calculated by the PU 72 based on the steering angle ratio determined according to the vehicle speed V by the target pinion angle calculation process M14.

An addition process M82 is a process of calculating the target reaction force Ts* by adding the PD manipulated variable Tpd and a second manipulated variable Ts2 output from the second manipulated variable calculation process M80.

Functions and Effects of Embodiment

Figure 5A:
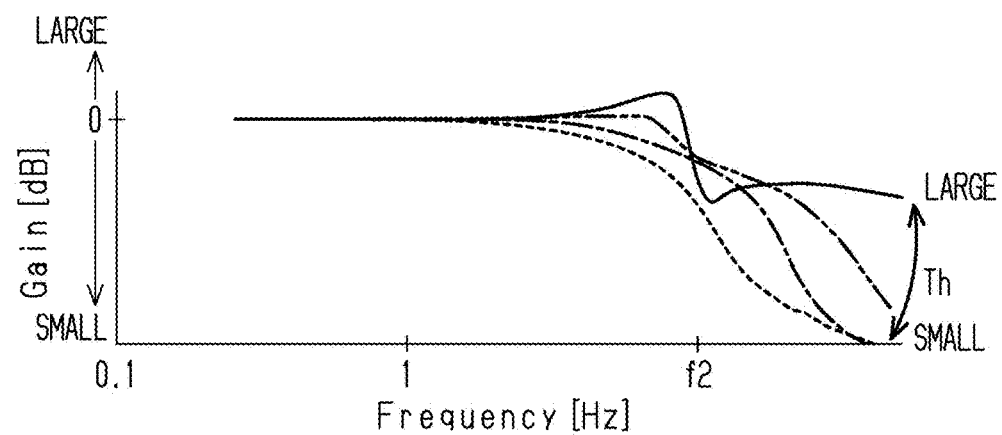
FIGS. 5A and 5B are time charts showing response characteristics of the first embodiment.
Figure 5B:
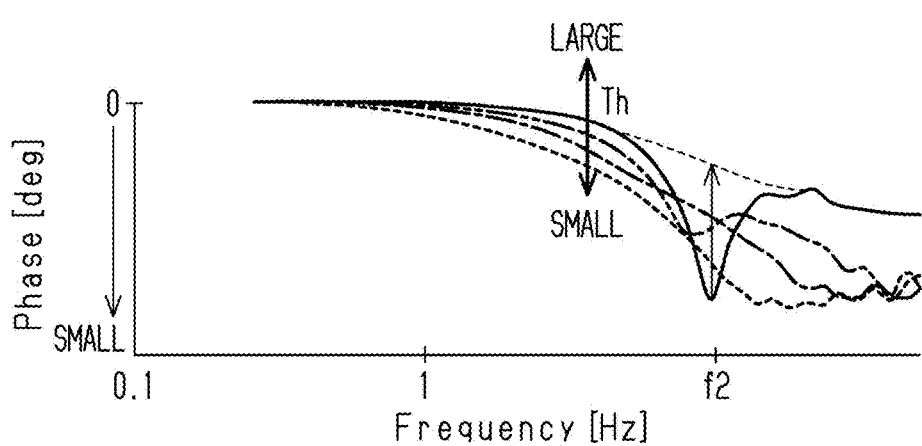

FIGS. 5A and 5B show Bode plots of the steering system 10 of the present embodiment, particularly the steering wheel 12, the steering shaft 14, and the reaction force actuator Ar. FIG. 5A is a gain plot. FIG. 5B is a phase plot.

As shown in FIGS. 5A and 5B, in the present embodiment, characteristics of a plant have a resonant frequency in a frequency range slightly smaller than a frequency f2. The frequency f2 is an antiresonance frequency. The reason why both resonance and antiresonance occur is that the torque sensor 80 has the torsion bar and therefore a double inertial system is formed by inertial systems connected to both sides of the torsion bar.

The resonance and antiresonance phenomena become evident in a region where the magnitude of the steering torque Th is large to some extent. This is considered to be because, in a region where the magnitude of the steering torque Th is small, a friction component is prominent when the steering wheel 12 is displaced, and the resonance and antiresonance phenomena are less likely to become evident. The plant characteristics shown in FIGS. 5A and 5B tend to be apparent in the case of a steer-by-wire steering device as in the present embodiment. This is presumably because, when the magnitude of the steering torque Th is large enough to overcome the friction component, the load applied to the steering wheel 12 is small. That is, when the steering wheel 12 and the steered wheels 44 are mechanically connected, load torque from the steered wheel 44 side is applied to the steering wheel 12. This load torque presumably tends to restrain the resonance and antiresonance phenomena from becoming evident.

When there is a resonant frequency, there is a risk that oscillation will occur due to the control toward the target steering torque Th*. When the proportional gain Kp is reduced in order to address this issue, responsiveness will decrease.

Figure 6A:
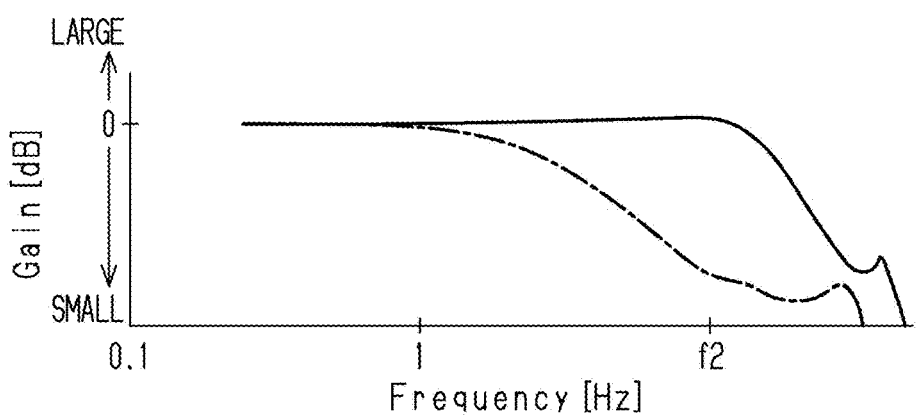
FIGS. 6A and 6B are diagrams showing effects of the first embodiment.
Figure 6B:
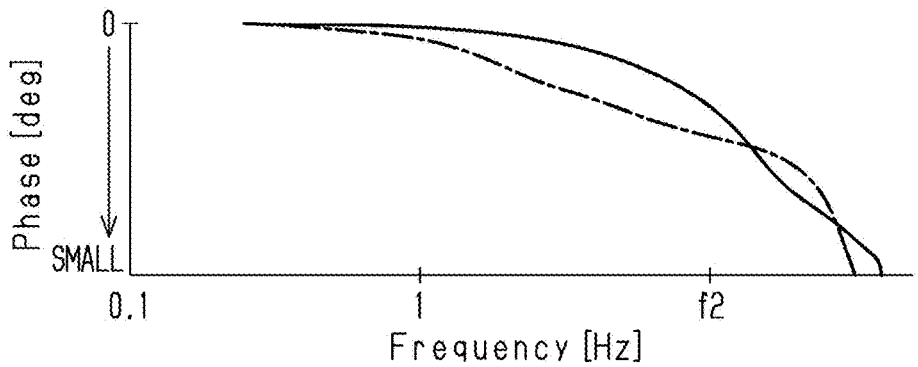

FIGS. 6A and 6B are Bode plots when the controllers of the present embodiment and a comparative example are used. FIG. 6A is a gain plot. FIG. 6B is a phase plot. In FIGS. 6A and 6B, continuous lines indicate gain and phase plots according to the present embodiment. In FIGS. 6A and 6B, long dashed short dashed lines indicate gain and phase plots of the comparative example. The comparative example is a case where the proportional phase controller M54 and the derivative phase controller M66 are not provided. The comparative example is an example in which the gain is reduced by, for example, reducing the proportional gain Kp in order to reduce instability due to resonance.

In the comparative example, a phase lag occurs due to the reduced gain. In the present embodiment, on the other hand, the proportional phase controller M54 and the derivative phase controller M66 increase the gain and reduce a phase lag.

Figure 7A:
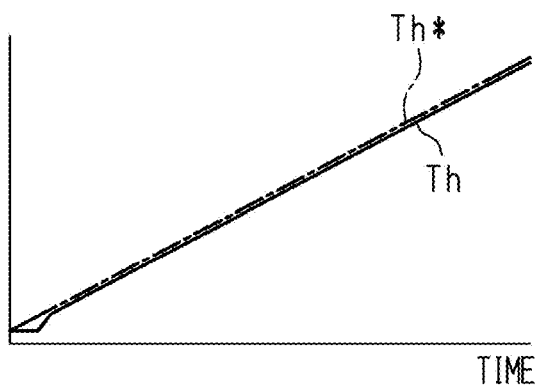
FIG. 7A is a time chart showing a characteristic of the first embodiment.
Figure 7B:
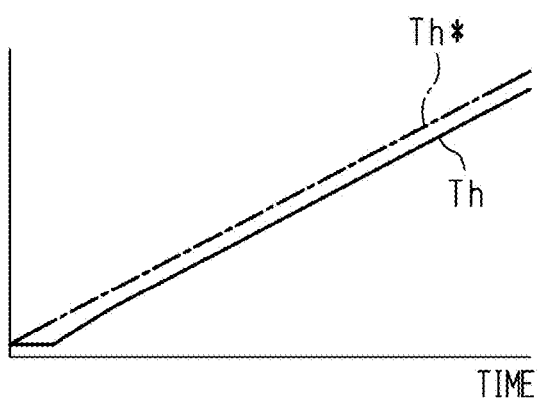
FIG. 7B is a time chart showing a characteristic of a comparative example.

FIGS. 7A and 7B show lamp responses with the characteristics of FIGS. 6A and 6B. FIG. 7A shows a lamp response characteristic according to the present embodiment. FIG. 7B shows a lamp response characteristic in the comparative example shown by the long dashed short dashed lines in FIGS. 6A and 6B.

As shown in FIG. 7A, in the present embodiment, responsiveness is improved, so that the steering torque Th follows the target steering torque Th*. As shown in FIG. 7B, on the other hand, in the comparative example, the steering torque Th does not follow the target steering torque Th* so well due to low responsiveness.

Figure 8A:
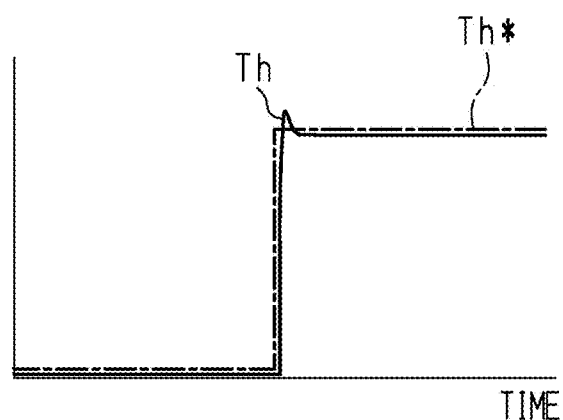
FIGS. 8A and 8B are diagrams showing effects of the first embodiment.
Figure 8B:
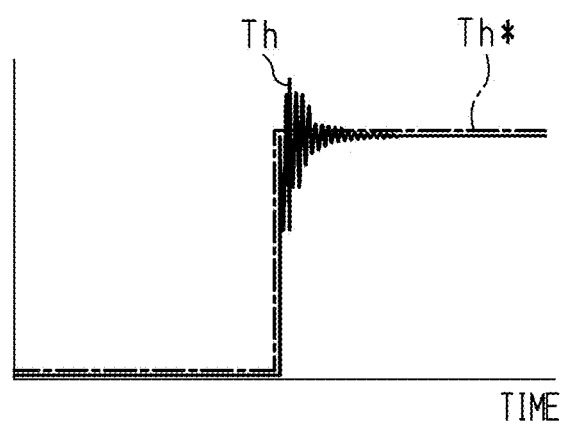

FIGS. 8A and 8B show step response characteristics of the steering torque Th. Specifically, FIG. 8A shows a step response characteristic of the steering torque Th in the present embodiment. FIG. 8B shows a step response characteristic of the steering torque Th in a comparative example. The comparative example is a case where the proportional phase controller M54 and the derivative phase controller M66 are not provided. However, the comparative example shown in FIG. 8B is an example in which the gain is less reduced compared to the comparative example shown by the long dashed short dashed lines in FIGS. 6A and 6B.

As shown in FIG. 8B, in the comparative example, oscillation occurs in a step response, which makes the control unstable. This is a phenomenon due to the plant characteristics shown in FIGS. 5A and 5B. As shown in FIG. 8A, on the other hand, oscillation is reduced in the present embodiment. This is implemented by retarding the phase of the proportional element M50 by the proportional phase controller M54 and advancing the phase of the derivative element M60 by the derivative phase controller M66 in the present embodiment.

That is, the phase of the proportional element M50 is retarded in order to reduce oscillation, while the phase of the derivative element M60 is advanced in order to improve responsiveness. In other words, an actual degree to which the phase of the derivative element M60 is advanced with respect to the proportional element M50 is enlarged with respect to the degree to which the phase of the derivative element M60 is advanced with respect to the proportional element M50 as determined by the proportional gain Kp and the derivative gain Kd. Both stability and responsiveness can be balanced in this manner.

Figure 9A:
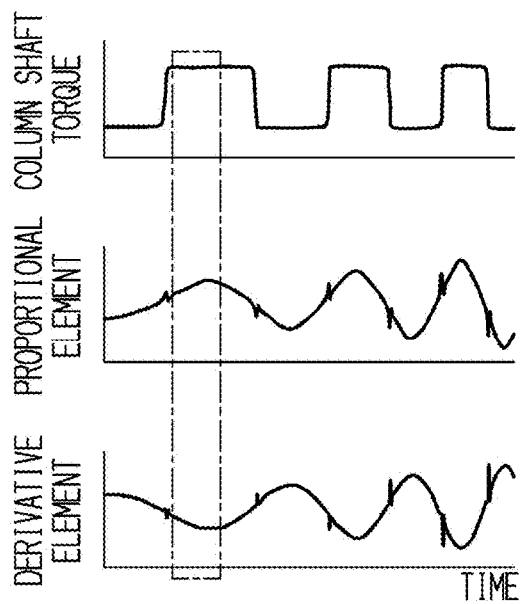
FIG. 9A shows time charts showing characteristics of the first embodiment.
Figure 9A:
Figure 9A:
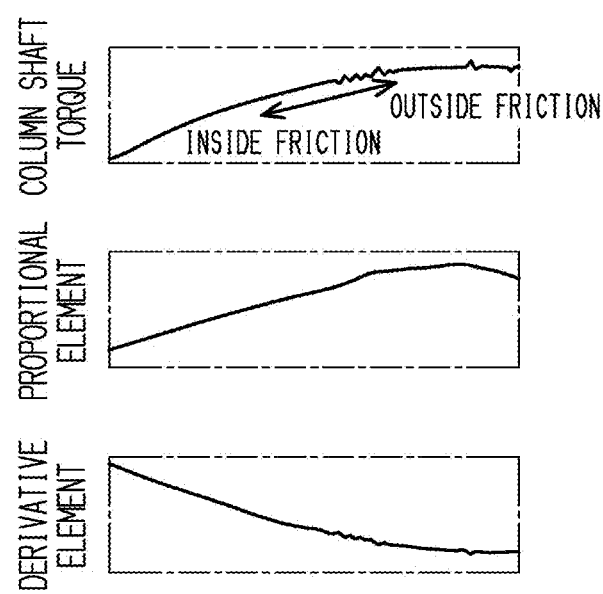
Figure 9B:
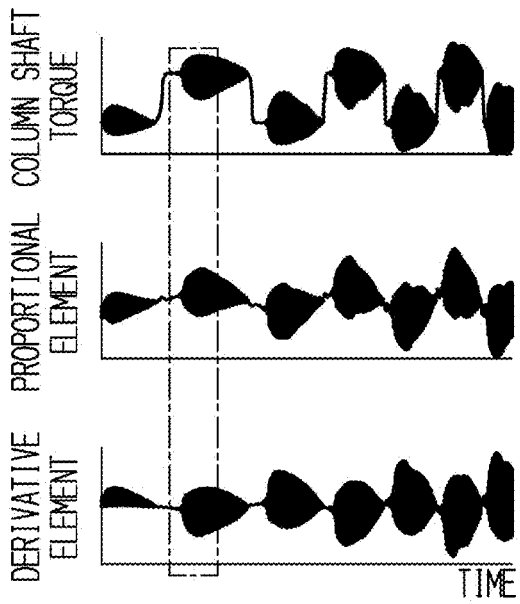
FIG. 9B shows time charts showing characteristics of a comparative example.
Figure 9B:
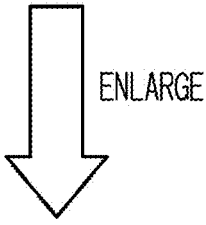
Figure 9B:
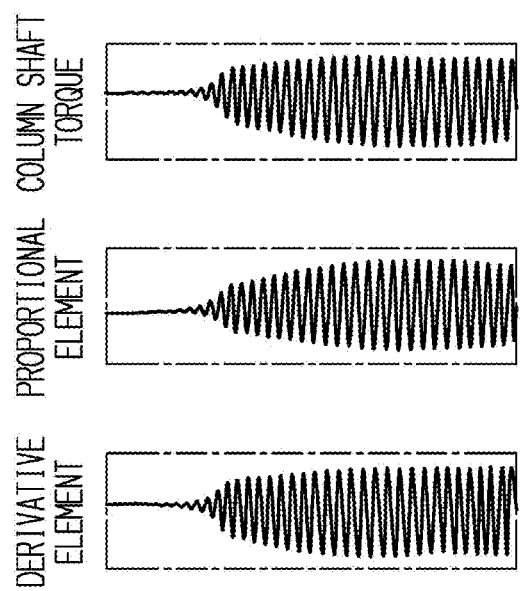

FIGS. 9A and 9B show changes in column shaft torque, output value of the proportional element M50, and output value of the derivative element M60. The column shaft torque is torque corresponding to the sum of the steering torque Th and the torque of the reaction force motor 20. FIG. 9A shows changes in the present embodiment. FIG. 9B shows changes in a comparative example. This comparative example is an example in which the gain is less reduced compared to the comparative example shown by the long dashed short dashed lines in FIGS. 6A and 6B. In particular, the comparative example uses a setting that does not cause oscillation in a steering system in which the steering wheel 12 is mechanically connected to the steered wheels 44.

As shown in FIG. 9B, in the comparative example, the column shaft torque, the output value of the proportional element M50, and the output value of the derivative element M60 oscillate as the column shaft torque increases. The column shaft torque deviates greatly from zero when friction generated at the steering shaft 14 has been overcome. The column shaft torque, the output value of the proportional element M50, and the output value of the derivative element M60 oscillate in a state where the friction has been overcome. This is presumably because, in the case of the steer-by-wire steering system 10, the steering shaft 14 is under nearly no load in the state where the friction has been overcome.

The embodiment described above further has the following functions and effects.

(1-1) The derivative phase controller M66 is a phase controller that advances the phase of the predetermined frequency component. Setting the center frequency f1 to a value near the frequency "f2" that exhibits the antiresonance phenomenon can increase responsiveness near the frequency "f2" that exhibits the antiresonance phenomenon while reducing an excessive increase in responsiveness in the other frequency bands. The center frequency f1 may be a frequency equal to or higher than the frequency "f2" that exhibits the antiresonance phenomenon.

(1-2) The proportional phase controller M54 is a first-order lag element. An adjustment element provided by the proportional phase controller M54 thus has a single cutoff frequency. This facilitates reduction in responsiveness in a frequency band in which the responsiveness of the proportional element M50 is desired to be reduced.

(1-3) The derivative phase controller M66 is a phase controller whose relative degree is "0" and whose numerator and denominator degrees are "1." This can reduce an excessive increase in number of adaptable parameters.

(1-4) The PU 72 operates the reaction force inverter 22 with the steering wheel 12 and the steered wheels 44 mechanically disconnected from each other. In other words, the control shown in FIG. 3 is used in a steer-by-wire type steering device. Even a controller that does not cause oscillation in a steering device in which the steering wheel 12 and the steered wheels 44 are mechanically connected may cause oscillation in a steer-by-wire steering device. Accordingly, the control shown in FIG. 3 is particularly useful.

Second Embodiment

A second embodiment will be described below with reference to the drawings, focusing on the differences from the first embodiment.

Figure 10:
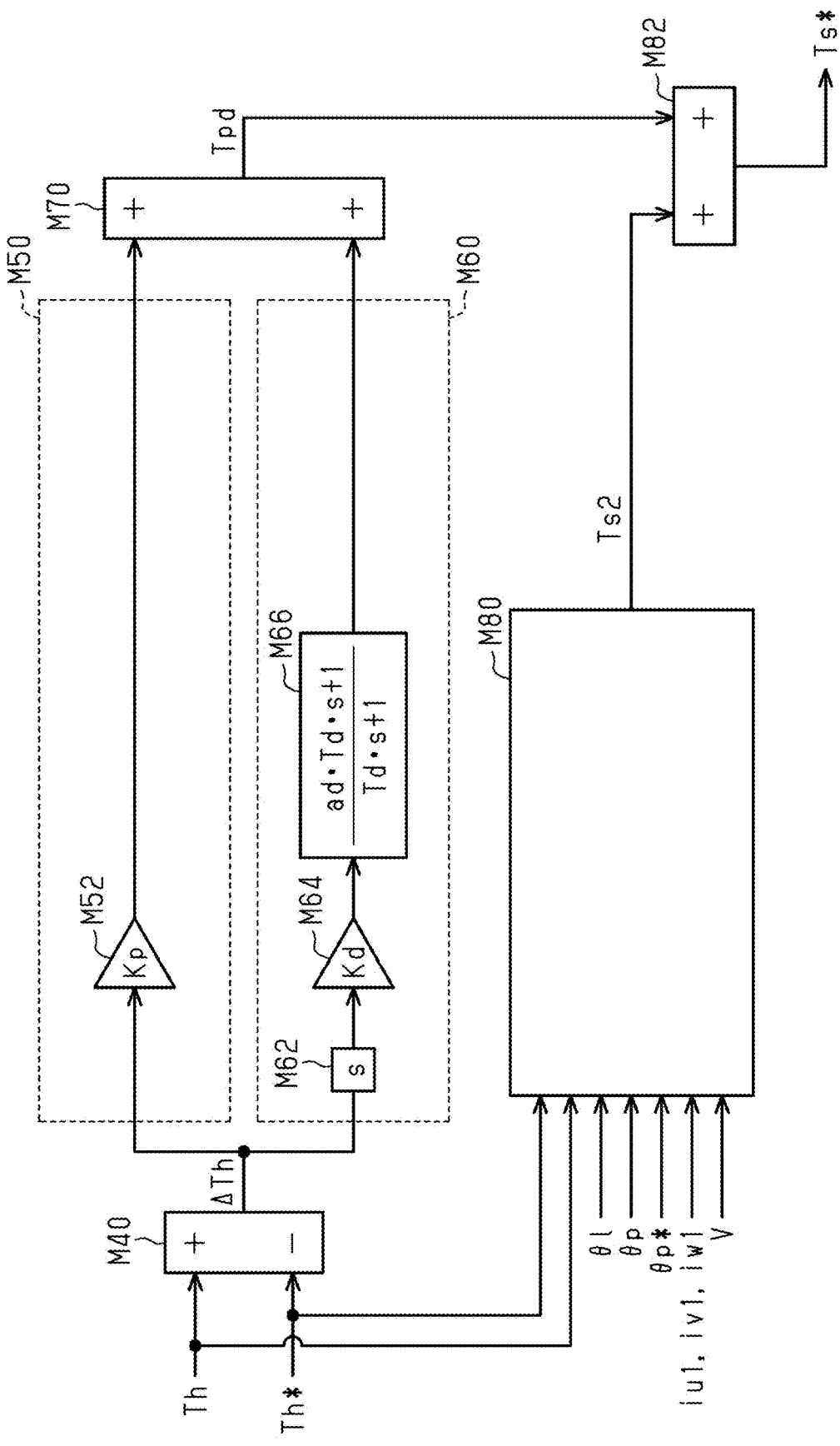
FIG. 10 is a block diagram showing details of part of processes that are performed by a control device according to a second embodiment.

FIG. 10 shows details of the target reaction force calculation process M26 according to the present embodiment. In FIG. 10, the processes corresponding to those shown in FIG. 3 are denoted by the same signs for convenience.

As shown in FIG. 10, the present embodiment does not include the proportional phase controller M54. However, the present embodiment includes the derivative phase controller M66. Therefore, the degree to which the phase of the derivative element M60 is advanced with respect to the phase of the proportional element M50 can be enlarged compared to a case where neither the proportional phase controller M54 nor the derivative phase controller M66 is provided.

Functions and Effects of Second Embodiment

Figure 11A:
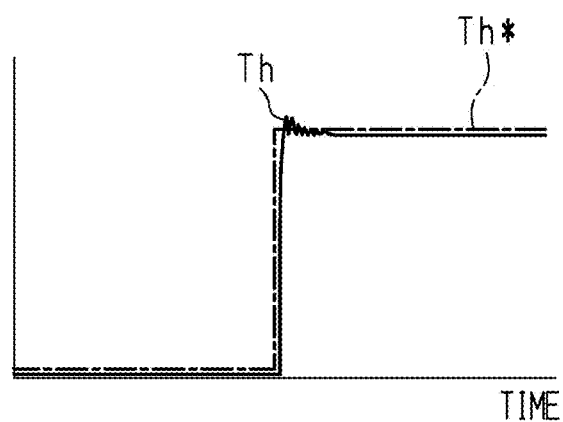
FIGS. 11A and 11B are diagrams showing effects of the second embodiment.
Figure 11B:
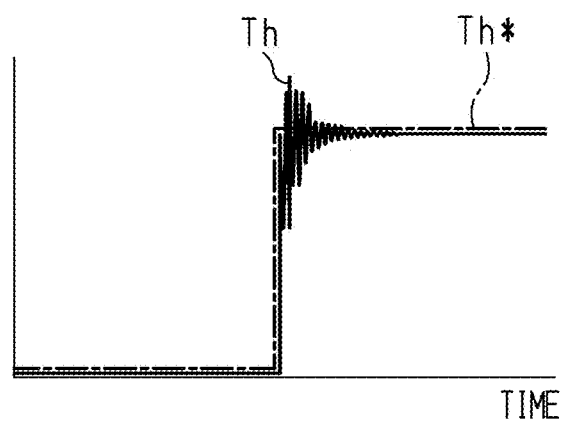

FIGS. 11A and 11B show step response characteristics in the present embodiment and a comparative example. Specifically, FIG. 11A shows a step response characteristic of the steering torque Th in the present embodiment. FIG. 11B shows a step response characteristic of the steering torque Th in the comparative example. The comparative example is the same as that in FIG. 8B.

As shown in FIGS. 11A and 11B, the present embodiment can also improve stability without reducing responsiveness.

Third Embodiment

A third embodiment will be described below with reference to the drawings, focusing on the differences from the first embodiment.

Figure 12:
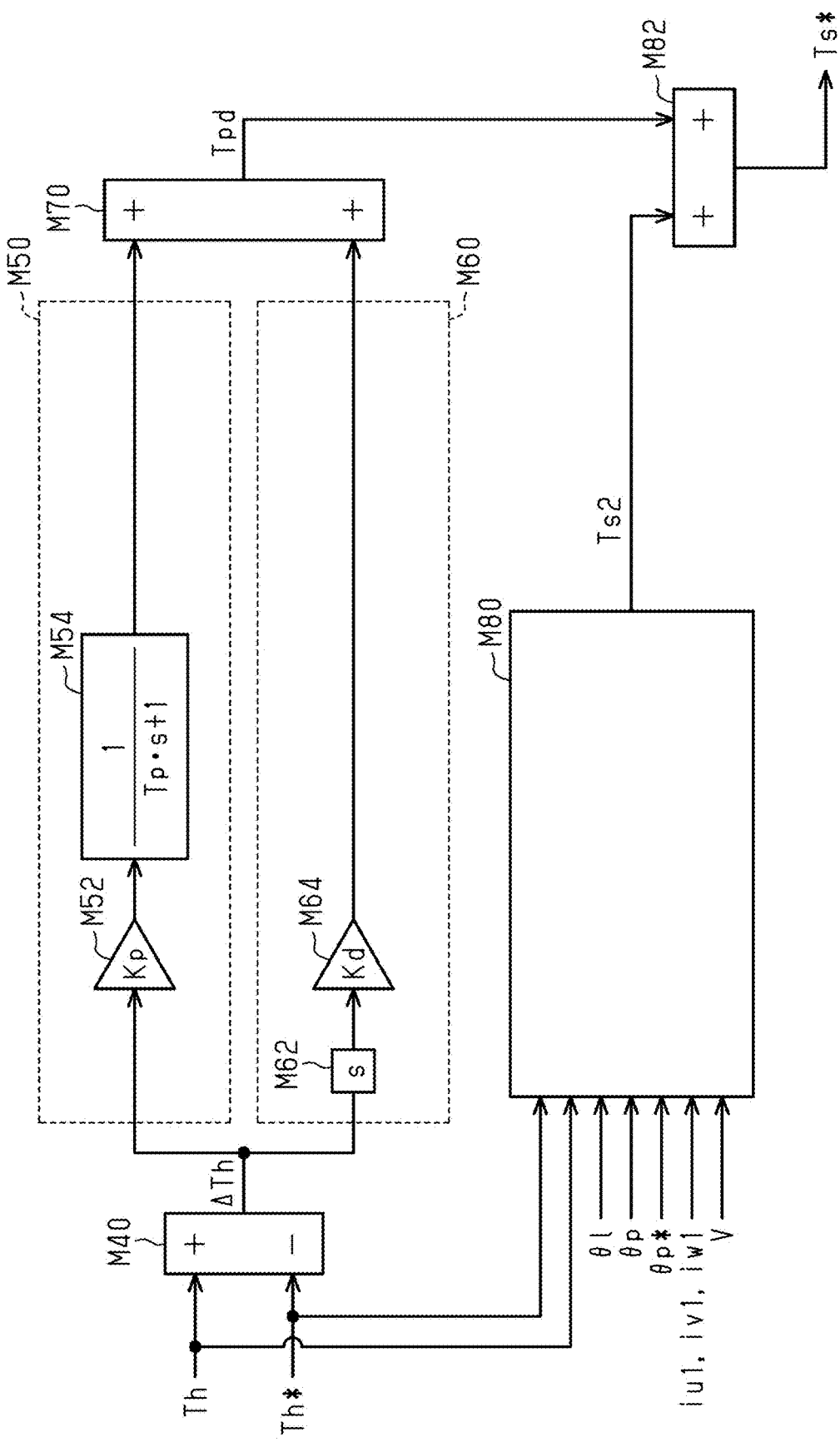
FIG. 12 is a block diagram showing details of part of processes that are performed by a control device according to a third embodiment.

FIG. 12 shows details of the target reaction force calculation process M26 according to the present embodiment. In FIG. 12, the processes corresponding to those shown in FIG. 3 are denoted by the same signs for convenience.

As shown in FIG. 12, the present embodiment does not include the derivative phase controller M66. However, the present embodiment includes the proportional phase controller M54. Therefore, the degree to which the phase of the derivative element M60 is advanced with respect to the phase of the proportional element M50 can be enlarged compared to the case where neither the proportional phase controller M54 nor the derivative phase controller M66 is provided.

Functions and Effects of Third Embodiment

Figure 13A:
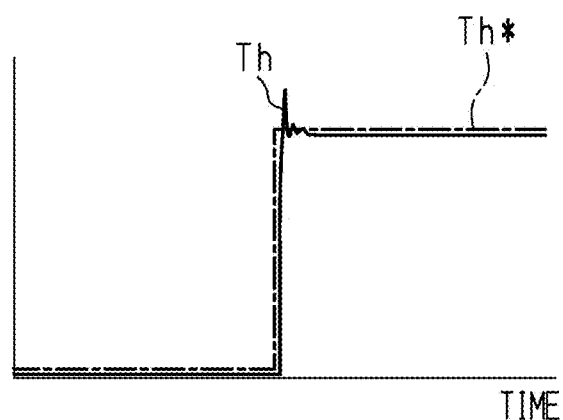
FIGS. 13A and 13B are diagrams showing effects of the third embodiment.
Figure 13B:
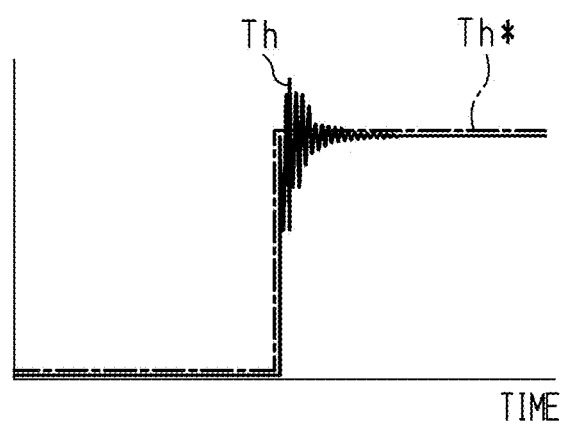

FIGS. 13A and 13B show step response characteristics in the present embodiment and a comparative example. Specifically, FIG. 13A shows a step response characteristic of the steering torque Th in the present embodiment. FIG. 13B shows a step response characteristic of the steering torque Th in the comparative example. The comparative example is the same as that in FIG. 8B.

As shown in FIGS. 13A and 13B, the present embodiment can also improve stability without reducing responsiveness.

Fourth Embodiment

A fourth embodiment will be described below with reference to the drawings, focusing on the differences from the first embodiment.

Figure 14:
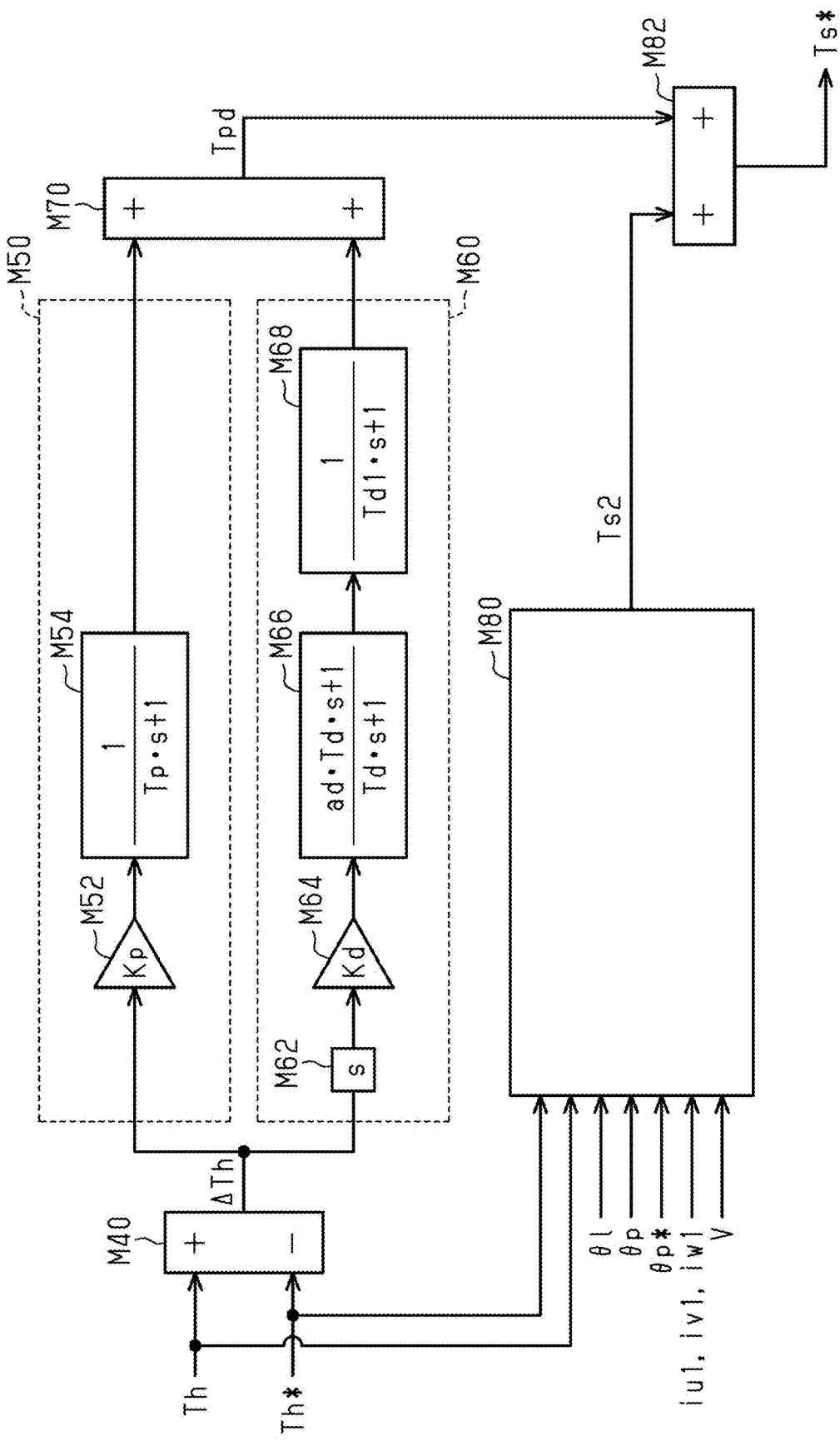
FIG. 14 is a block diagram showing details of part of processes that are performed by a control device according to a fourth embodiment.

FIG. 14 shows details of the target reaction force calculation process M26 according to the present embodiment. In FIG. 14, the processes corresponding to those shown in FIG. 3 are denoted by the same signs for convenience.

As shown in FIG. 14, the present embodiment includes a derivative phase controller M68 that is a second derivative phase controller, in addition to the derivative phase controller M66 that is a first derivative phase controller. The derivative phase controller M68 is a first-order lag element shown below.

$$1/(Td1 \cdot s + 1)$$

A cutoff frequency of the derivative phase controller M68 is a frequency higher than the center frequency f1 shown in FIG. 4. That is, the derivative phase controller M68 is a phase controller that retards the phase in a frequency band higher than the frequency whose phase is to be advanced by the derivative phase controller M66.

Functions and Effects of Fourth Embodiment

The derivative phase controller M66 advances the phase in the frequency band in which a phase lag occurs due to antiresonance. The derivative phase controller M66 also advances the phase in a frequency range higher than the frequency band in which a phase lag occurs due to antiresonance. If the phase in a high frequency range is advanced excessively, noise is likely to be generated in the steering system 10. Therefore, in the present embodiment, regarding the frequency range higher than the frequency band in which a phase lag occurs due to antiresonance, the phase advanced by the derivative phase controller M66 is retarded by the derivative phase controller M68. Noise is therefore less likely to be generated in the steering system 10.

Fifth Embodiment

A fifth embodiment will be described below with reference to the drawings, focusing on the differences from the fourth embodiment.

Figure 15:
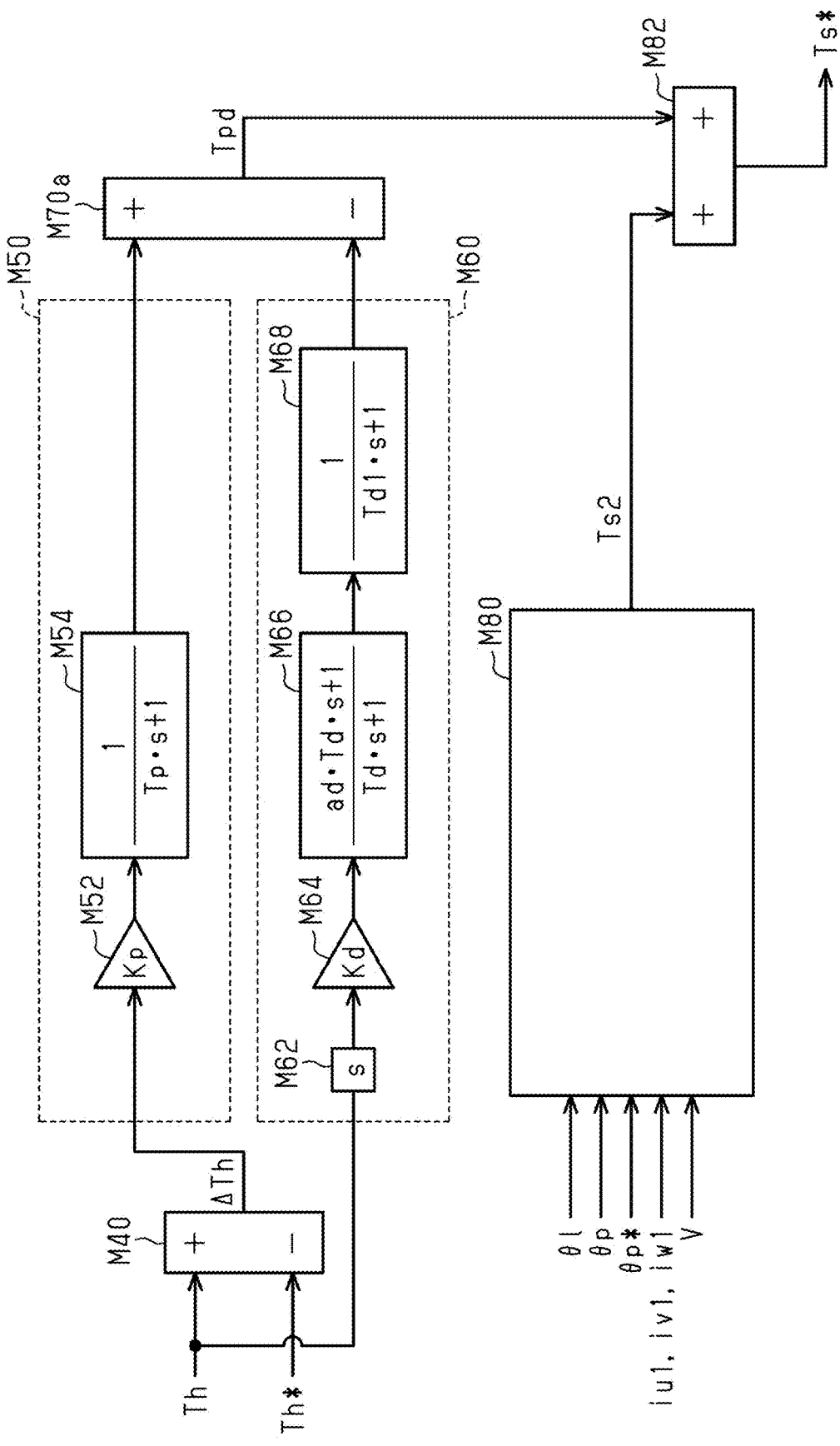
FIG. 15 is a block diagram showing details of part of processes that are performed by a control device according to a fifth embodiment.

FIG. 15 shows details of the target reaction force calculation process M26 according to the present embodiment. In FIG. 15, the processes corresponding to those shown in FIG. 14 are denoted by the same signs for convenience.

As shown in FIG. 15, in the present embodiment, the input of the derivative element M60 is the steering torque Th. Accordingly, the linear operator M62 is a process of calculating the first time derivative of the steering torque Th. The derivative gain multiplication process M64 is a process of multiplying the first time derivative of the steering torque Th by the derivative gain Kd. The PD manipulated variable is a value obtained by subtracting the output value of the derivative element M60 from the output value of the proportional element M50 in a subtraction process M70a.

As described above, the PD manipulated variable Tpd according to the present embodiment is a manipulated variable of derivative leading PD control.

Other Embodiments

The embodiments can be modified and carried out as follows. The embodiments and the following modifications can be combined unless technical contradictions arise.

"Regarding Proportional Element"

For example, the proportional phase controller M54 may be provided upstream of the proportional gain multiplication process.

"Regarding Derivative Element"

For example, the derivative phase controller M66 may be provided between the linear operator M62 and the derivative gain multiplication process M64. Alternatively, for example, the derivative phase controller M66 may be provided upstream of the linear operator M62.

For example, the derivative phase controller M68 may be provided between the derivative phase controller M66 and the derivative gain multiplication process M64. Alternatively, for example, the derivative phase controller M68 may be provided between the linear operator M62 and the derivative gain multiplication process M64.

"Regarding Proportional Phase Controller"

The proportional phase controller is not limited to the first-order lag element. For example, the proportional phase controller may be a second-order lag element. Alternatively, the proportional phase controller may be a phase controller with a relative degree of zero as shown below.

$$\alpha p \cdot (Tp2 \cdot s + 1)/(Tp1 \cdot s + 1)$$

where "$\alpha p < 1$."

"Regarding Derivative Phase Controller That Advances Phase of Predetermined Frequency"

The derivative phase controller that advances the phase of the predetermined frequency is not limited to that shown in the above embodiments.

"Regarding Second Derivative Phase Controller"

The embodiments in which the derivative phase controller M68 is provided are not limited to the configuration in which the proportional phase controller M54 is provided in the proportional element M50.

The second derivative phase controller that is a derivative phase controller for retarding the phase is not limited to the first-order lag element. For example, the second derivative phase controller may be a second-order lag element. Alternatively, the second derivative phase controller may be a phase controller with a relative degree of zero as shown below.

$$\alpha d1 \cdot (Td2 \cdot s + 1)/(Td1 \cdot s + 1)$$

where "$\alpha d1 < 1$."

"Regarding Enlarging Phase Controller"

The enlarging phase controller in the case where the PD manipulated variable Tpd is a manipulated variable of derivative leading PD control is not limited to the controller shown in FIG. 15. For example, the enlarging phase controller may be the phase controllers shown in FIGS. 10, 12, etc.

The enlarging phase controller is not limited to the controllers shown in the above embodiments and modifications thereof. For example, both the proportional phase controller and the derivative phase controller may be first-order lag elements. However, the degree of phase lag compensation by the proportional phase controller is set to be greater than the degree of phase lag compensation by the derivative element. This also makes it possible to configure a controller that enlarges the degree to which the phase of the derivative element is advanced with respect to the phase of the proportional element.

"Regarding Manipulated Variable for Controlling Steering Torque to Target Steering Torque"

The manipulated variable for controlling the steering torque to the target steering torque is not limited to the target reaction force Ts*. In other words, the manipulated variable is not limited to the target value of torque for the reaction force motor 20. For example, when the reaction force motor 20 is a surface permanent magnet synchronous motor, the manipulated variable may be a command value for a q-axis current. Alternatively, when the reaction force motor 20 is an interior permanent magnet synchronous motor, the manipulated variable may be a set of a command value for a d-axis current and a command value for a q-axis current.

The manipulated variable for controlling the steering torque to the target steering torque is not limited to the variable indicating the reaction force to be applied to the steering wheel 12. For example, in the case of a device in which power can be transmitted between the steering wheel 12 and the steered wheels 44 as described in the section "Regarding Steering Device" below, the manipulated variable is a variable indicating torque that assists torque applied to the steering wheel 12 by the driver.

"Regarding Steering Torque Control Process"

The target reaction force calculation process M26 that is the steering torque control process need not necessarily include the second manipulated variable calculation process M80.

"Regarding Process of Calculating Base Target Torque Thb*"

The process of calculating the base target torque Thb* by using the axial force Taf as an input is not limited to the process that takes the vehicle speed V as an input in addition to the axial force Taf.

It is not essential to calculate the base target torque Thb* by using the axial force Taf as an input. For example, the base target torque Thb* may be calculated by using the steering torque Th and the vehicle speed V as inputs. For example, this can be implemented by the PU 72 performing a map calculation of the base target torque Thb* with map data stored in the storage device 74. The map data is data whose input variables are the steering torque Th and the vehicle speed V and whose output variable is the base target torque Thb *.

"Regarding Operation Process"

The technique of controlling the reaction force motor 20 is not limited to the feedback process for the dq-axis currents. For example, in the case where a direct current motor is used as the reaction force motor 20 and an H-bridge circuit is used as the drive circuit, a current that flows through the reaction force motor 20 need only be controlled.

The operation process need not necessarily be a process of outputting the PD manipulated variable Tpd or the sum of the PD manipulated variable and the second manipulated variable Ts2 as a command value for a motor such as the reaction force motor 20. For example, the operation process may include a process of calculating a command value for the rotation angle of the reaction force motor 20 by using the PD manipulated variable Tpd or the sum of the PD manipulated variable and the second manipulated variable Ts2 as an input. For example, this can be implemented as follows. That is, the PU 72 calculates torque to be applied to the steering shaft 14 according to the PD manipulated variable Tpd or the sum of the PD manipulated variable and the second manipulated variable Ts2. This calculation process may take the steering torque Th into account. The PU 72 then calculates the rotation angle of the steering shaft 14 by inputting the torque to be applied to the steering shaft 14 into a model expression of the steering device. The PU 72 calculates a command value for the rotation angle of the reaction force motor 20 according to this rotation angle.

"Regarding Control on Steered Angle"

A process of controlling a detection value of the amount of movement of the steered shaft 40 to a target value by feedback control may be used instead of the pinion angle feedback process M16. In this case, the controlled variable for the pinion angle θp etc. in the above embodiments is replaced with a controlled variable for the amount of movement of the steered shaft 40 etc.

The control on the steered angle need not necessarily include the process of calculating the manipulated variable for controlling the controlled variable indicating the steered angle such as the pinion angle θp by feedback control. For example, the control on the steered angle may include a process of calculating a manipulated variable for controlling the controlled variable indicating the steered angle to a target value by open-loop control. Alternatively, for example, the control on the steered angle may include a process of calculating the sum of the manipulated variable for the open-loop control and the manipulated variable for the feedback control.

The technique of controlling the steering motor 60 is not limited to the feedback process for the dq-axis currents. For example, in the case where a direct current motor is used as the steering motor 60 and an H-bridge circuit is used as the drive circuit, a current that flows through the steering motor 60 need only be controlled.

"Regarding Operating Member"

The operating member to be operated by the driver to steer the vehicle is not limited to the steering wheel 12. For example, the operating member may be a joystick.

"Regarding Motor Mechanically Connected to Operating Member"

(a) Regarding Reaction Force Actuator Ar

The reaction force motor 20 mechanically connected to the steering wheel 12 is not limited to the three-phase brushless motor. For example, the reaction force motor 20 may be a brushed direct current motor.

(b) Regarding Drive Circuit for Motor

The drive circuit for the motor mechanically connected to the operating member is not limited to the reaction force inverter 22. For example, the drive circuit may be an H-bridge circuit.

(c) Others

The speed reduction mechanism 16 need not necessarily be provided.

"Regarding Steering Control Device"

The steering control device is not limited to the control device that includes the PU 72 and the storage device 74 and that performs software processing. For example, the steering control device may include a dedicated hardware circuit such as an ASIC that performs at least part of the processes performed in the above embodiments. That is, the control device may include a processing circuit including any of the following configurations (a) to (c): (a) a processing circuit including a processing device that performs all of the above processes according to a program, and a program storage device such as a storage device that stores the program, (b) a processing circuit including a processing device that performs part of the above processes according to a program, a program storage device, and a dedicated hardware circuit that performs the remainder of the above processes, and (c) a processing circuit including a dedicated hardware circuit that performs all of the above processes. The number of software execution devices including a processing device and a program storage device may be two or more. The number of dedicated hardware circuits may be two or more.

"Regarding Steering Actuator"

For example, an actuator in which the steering motor 60 is disposed coaxially with the steered shaft 40 may be used as the steering actuator At. Alternatively, for example, an actuator connected to the steered shaft 40 via a belt speed reducer using a ball screw mechanism may be used as the steering actuator At The steering actuator At is not limited to the one configured so that the right steered wheel 44 and the left steered wheel 44 operate in conjunction with each other. In other words, the steering actuator At may be configured to control the right steered wheel 44 and the left steered wheel 44 independently of each other.

"Regarding Steering Device"

The steering device that can change the relationship between the steering angle and the steered angle is not limited to the steering device in which power transmission between the steering wheel 12 and the steered wheels 44 is disconnected. For example, the steering device may be configured to change the relationship between the steering angle and the steered angle by using a variable gear as a gear that allows power transmission between the steering wheel 12 and the steered wheels 44. The steering device is not limited to the steering device that can change the relationship between the steering angle and the steered angle. For example, the steering device may be a steering device in which the steering wheel 12 and the steered wheels 44 are mechanically connected.

The invention claimed is:

1. A steering control device that operates a motor mechanically connected to an operating member to be operated by a driver to steer a vehicle, wherein
the steering control device is configured to perform a steering torque control process and an operation process,
the steering torque control process includes a process of calculating a manipulated variable for controlling steering torque to target steering torque by using a proportional element and a derivative element according to a difference between the steering torque and the target steering torque,
the operation process is a process of operating a drive circuit for the motor in order to control torque of the motor according to the manipulated variable,
the steering torque is torque input to the operating member,
at least one of the following two elements includes an enlarging phase controller: the proportional element and the derivative element, and
the enlarging phase controller is configured to enlarge a degree to which a phase of the derivative element is advanced with respect to a phase of the proportional element.

2. The steering control device according to claim 1, wherein
the proportional element includes a proportional phase controller that is the enlarging phase controller,
the proportional phase controller is configured to retard the phase of the proportional element, the derivative element includes a derivative phase controller that is the enlarging phase controller, and
the derivative phase controller is configured to advance the phase of the derivative element.

3. The steering control device according to claim 1, wherein
the proportional element includes a proportional phase controller that is the enlarging phase controller, and
the proportional phase controller is configured to retard the phase of the proportional element.

4. The steering control device according to claim 1, wherein
the derivative element includes a derivative phase controller that is the enlarging phase controller, and
the derivative phase controller is configured to advance the phase of the derivative element.

5. The steering control device according to claim 2, wherein the derivative phase controller is configured to advance a phase of a predetermined frequency component.

6. The steering control device according to claim 4, wherein the derivative phase controller is configured to advance a phase of a predetermined frequency component.

7. The steering control device according to claim 5, wherein
the derivative phase controller is a first derivative phase controller, the derivative element includes a second derivative phase controller in addition to the first derivative phase controller, and
the second derivative phase controller is configured to retard a phase of a frequency component higher than the predetermined frequency component in an output of the derivative element.

8. The steering control device according to claim 6, wherein
the derivative phase controller is a first derivative phase controller, the derivative element includes a second derivative phase controller in addition to the first derivative phase controller, and
the second derivative phase controller is configured to retard a phase of a frequency component higher than the predetermined frequency component in an output of the derivative element.

9. The steering control device according to claim 2, wherein the proportional phase controller is a first-order lag element.

10. The steering control device according to claim 3, wherein the proportional phase controller is a first-order lag element.

11. The steering control device according to claim 2, wherein the derivative phase controller is a phase controller with a relative degree of zero.

12. The steering control device according to claim 4, wherein the derivative phase controller is a phase controller with a relative degree of zero.

13. The steering control device according to claim 7, wherein the second derivative phase controller is a first-order lag element.

14. The steering control device according to claim 8, wherein the second derivative phase controller is a first-order lag element.

15. The steering control device according to claim 1, wherein the derivative element takes the difference between the steering torque and the target steering torque as an input.

16. The steering control device according to claim 1, wherein the derivative element takes the steering torque as an input.

17. The steering control device according to claim 1, wherein the steering control device is configured to perform the operation process with the operating member and a steered wheel of the vehicle being mechanically disconnected from each other.

18. A steering control method for operating a motor mechanically connected to an operating member to be operated by a driver to steer a vehicle, the steering control method comprising:
performing a steering torque control process; and
performing an operation process, wherein
the steering torque control process includes a process of calculating a manipulated variable for controlling steering torque to target steering torque by using a proportional element and a derivative element according to a difference between the steering torque and the target steering torque,
the operation process is a process of operating a drive circuit for the motor in order to control torque of the motor according to the manipulated variable,
the steering torque is torque input to the operating member, and
the steering torque control process includes a process of enlarging a degree to which a phase of the derivative element is advanced with respect to a phase of the proportional element, by providing an enlarging phase controller in at least one of the following two elements: the proportional element and the derivative element.

* * * * *